US012640854B2

(12) United States Patent
Wu

(10) Patent No.: US 12,640,854 B2
(45) Date of Patent: May 26, 2026

(54) INFORMATION PROCESSING METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 485 days.

(21) Appl. No.: 18/075,742

(22) Filed: Dec. 6, 2022

(65) Prior Publication Data

US 2023/0099072 A1      Mar. 30, 2023

Related U.S. Application Data

(63) Continuation of application No. PCT/CN2020/104982, filed on Jul. 27, 2020.

(51) Int. Cl.
*H04L 1/1812* (2023.01)
*H04L 1/1829* (2023.01)

(52) U.S. Cl.
CPC .......... *H04L 1/1854* (2013.01); *H04L 1/1812* (2013.01)

(58) Field of Classification Search
CPC ... H04L 1/1854; H04L 1/1812; H04L 1/1822; H04L 1/1864
See application file for complete search history.

(56) References Cited

U.S. PATENT DOCUMENTS

| | | | |
|---|---|---|---|
| 9,667,388 B2 | 5/2017 | Chen | |
| 10,594,446 B2 | 3/2020 | Chen | |
| 2015/0063180 A1 | 3/2015 | Chen et al. | |

(Continued)

FOREIGN PATENT DOCUMENTS

| | | |
|---|---|---|
| CN | 103518345 A | 1/2014 |
| CN | 108809541 A | 11/2018 |
| CN | 109391372 A | 2/2019 |

OTHER PUBLICATIONS

Supplementary European Search Report in the European application No. 20946655.6, mailed on May 25, 2023. 9 pages.

(Continued)

*Primary Examiner* — Moo Jeong
*Assistant Examiner* — David Zhijun Sun
(74) *Attorney, Agent, or Firm* — Ladas & Parry LLP

(57) ABSTRACT

A method for information processing, a terminal device, and a network device. The terminal device acquires a first configuration set. The first configuration set includes one or more configuration parameters corresponding to HARQ feedback timing information. The terminal device receives first Downlink Control Information (DCI). The first DCI is used to instruct the terminal device to transmit a first downlink physical channel through a first HARQ process. If the first HARQ process corresponds to an enabled state, the terminal device acquires a HARQ feedback timing sequence corresponding to the first HARQ process based on the first configuration set. Or, if the first HARQ process corresponds to a non-enabled state, the terminal device does not acquire the HARQ feedback timing sequence corresponding to the first HARQ process.

17 Claims, 6 Drawing Sheets

```
                                              ┌── S101
┌─────────────────────────────────────────────┐
│ A terminal device acquires first configuration│
│ information. The first configuration          │
│ information includes one or more configuration│
│ parameters corresponding to Hybrid Automatic  │
│ Repeat Request (HARQ) feedback timing         │
│ information                                   │
└─────────────────────────────────────────────┘
                                              ┌── S102
┌─────────────────────────────────────────────┐
│ The terminal device receives first Downlink   │
│ Control Information (DCI). The first DCI is    │
│ used to instruct the terminal device to       │
│ transmit a first downlink physical channel    │
│ through a first HARQ process                  │
└─────────────────────────────────────────────┘
                                              ┌── S103
┌─────────────────────────────────────────────┐
│ If the first HARQ process corresponds to an   │
│ enabled state, the terminal device acquires a │
│ HARQ feedback timing corresponding to the     │
│ first HARQ process based on the first         │
│ configuration information; or if the first    │
│ HARQ process corresponds to a disabled state, │
│ the terminal device does not acquire the HARQ │
│ feedback timing corresponding to the first    │
│ HARQ process                                  │
└─────────────────────────────────────────────┘
```

(56) References Cited

U.S. PATENT DOCUMENTS

| | | | |
|---|---|---|---|
| 2017/0244522 A1 | 8/2017 | Chen et al. | |
| 2020/0014497 A1 | 1/2020 | Chen et al. | |
| 2020/0067655 A1 | 2/2020 | Zheng et al. | |
| 2020/0177322 A1 | 6/2020 | Xu et al. | |
| 2022/0287011 A1* | 9/2022 | Liu | H04L 1/1825 |
| 2022/0294569 A1* | 9/2022 | Matsuda | H04W 72/044 |
| 2023/0319822 A1* | 10/2023 | Park | H04L 1/0003 |
| | | | 370/329 |

OTHER PUBLICATIONS

Intel Corporation: "Discussion on HARQ for NTN", 3GPP Draft; R1-1908644 Discussion on HARQ for NTN, 3rd Generation Partnership Project (3GPP), Mobile Competence Centre;650, Route Des Lucioles; F-06921 Sophia-Antipolis Cedex; France vol. RAN WG1, No. Prague, Czech Republic; Aug. 26, 2019-Aug. 30, 2019Aug. 17, 2019 (Aug. 17, 2019), XP051765252, p. 2 -p. 3. 4 pages.

Mediatek Inc: "Delay-tolerant re-transmission mechanisms in NR-NTN", 3GPP Draft; R1-1909984-Mediatek-Delay-Tolerant Re-Transmission Mechanisms in NR-NTN, 3rd Generation Partnership Project (3GPP), Mobile Competence Centre; 650, Route Des Lucioles; F-06921 Sophia-Anti vol. RAN WG1, No. Chongqing, China; Oct. 14, 2019-Oct. 20, 2019Oct. 4, 2019 (Oct. 4, 2019), XP051808062, p. 2-p. 3, p. 5-p. 6. 6 pages.

International Search Report in the international application No. PCT/CN2020/104982, mailed on May 8, 2021.

English translation of the Written Opinion of the International Search Authority in the international application No. PCT/CN2020/104982, mailed on May 8, 2021.

3GPP TR 38.821 V16.0.0, "3rd Generation Partnership Project; Technical Specification Group Radio Access Network; Solutions for NR to support non-terrestrial networks (NTN) (Release 16)", Technical Report, (Dec. 2019).

ZTE, "Discussion on the enhancement of NTN", 3GPP TSG RAN WG1 #101 R1-2003560, e-Meeting, May 25-Jun. 5, 2020.

* cited by examiner

1000

| Downlink carrier | PDSCH 0 HARQ 7 NDI = 0 | | PDSCH 1 HARQ 7 NDI = 1 | | PDSCH 2 HARQ 7 NDI = 0 | |
|---|---|---|---|---|---|---|

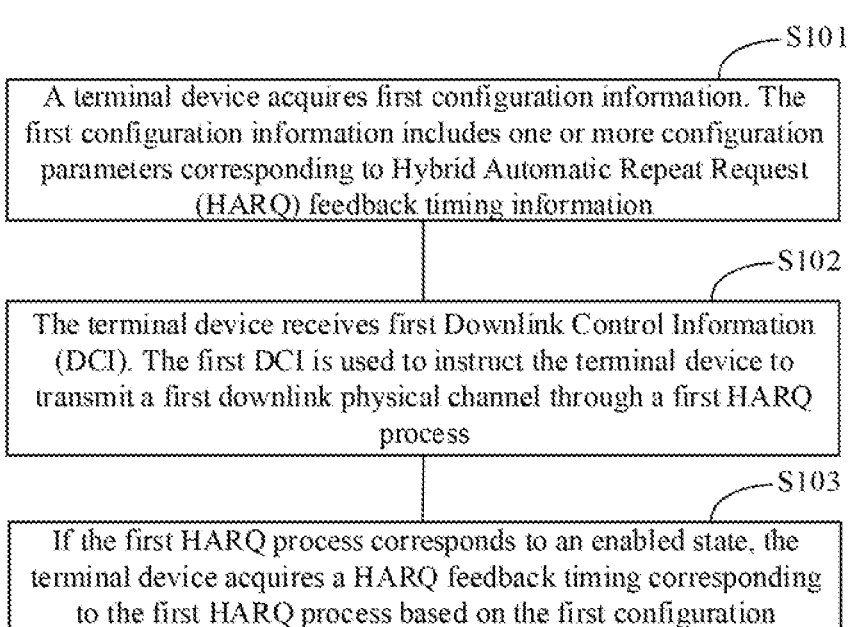

A terminal device acquires first configuration information. The first configuration information includes one or more configuration parameters corresponding to Hybrid Automatic Repeat Request (HARQ) feedback timing information ⌐S101

The terminal device receives first Downlink Control Information (DCI). The first DCI is used to instruct the terminal device to transmit a first downlink physical channel through a first HARQ process ⌐S102

If the first HARQ process corresponds to an enabled state, the terminal device acquires a HARQ feedback timing corresponding to the first HARQ process based on the first configuration information; or if the first HARQ process corresponds to a disabled state, the terminal device does not acquire the HARQ feedback timing corresponding to the first HARQ process ⌐S103

FIG. 3

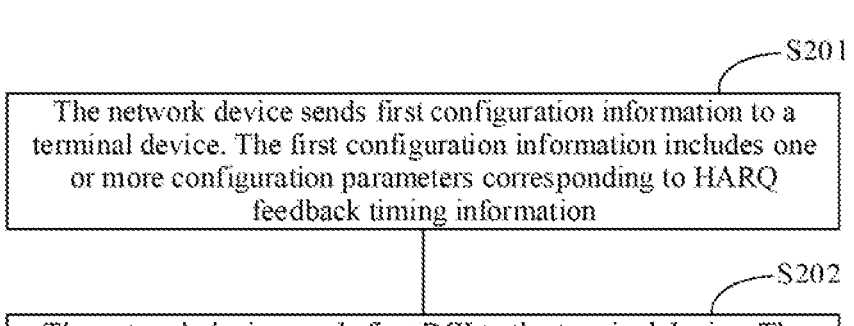

The network device sends first configuration information to a terminal device. The first configuration information includes one or more configuration parameters corresponding to HARQ feedback timing information ⌐S201

The network device sends first DCI to the terminal device. The first DCI is used to instruct the terminal device to transmit a first downlink physical channel through a first HARQ process. Herein, when the first HARQ process corresponds to an enabled state, the first configuration information is used to enable the terminal device to acquire a HARQ feedback timing corresponding to the first HARQ process based on the first configuration information; or when the first HARQ process corresponds to a disabled state, the first configuration information is used to disable the terminal device to acquire the HARQ feedback timing corresponding to the first HARQ process ⌐S202

FIG. 4

INFORMATION PROCESSING METHOD, TERMINAL DEVICE AND NETWORK DEVICE

CROSS REFERENCE TO RELATED APPLICATIONS

This a continuation of International Application No. PCT/CN2020/104982, filed on Jul. 27, 2020, and entitled "INFORMATION PROCESSING METHOD, TERMINAL DEVICE AND NETWORK DEVICE", the disclosure of which is incorporated herein by reference in its entirety.

TECHNICAL FIELD

The present disclosure relates to the field of communications, and in particular to a method for information processing, a terminal device and a network device.

BACKGROUND

In a Non-Terrestrial Networks (NTN) system, the Round Trip Time (RTT) of signal transmission is much longer than the RTT of a terrestrial communication system due to the long communication distance between a terminal device and a satellite or a network device, and therefore a Hybrid Automatic Repeat Request (HARQ) mechanism in an existing New Radio (NR) system is no longer applicable to the NTN system, and needs to be optimized according to application requirements.

SUMMARY

In view of this, embodiments of the present disclosure provide a method for information processing, a terminal device, and a network device.

The embodiments of the present disclosure provide a method for information processing, applied to the terminal device, including the following operations.

The terminal device acquires a first configuration set. The first configuration set includes one or more configuration parameters corresponding to Hybrid Automatic Repeat Request (HARQ) feedback timing information.

The terminal device receives first Downlink Control Information (DCI). The first DCI is used to instruct the terminal device to transmit a first downlink physical channel through a first HARQ process.

In response to the first HARQ process corresponding to an enabled state, the terminal device acquires a HARQ feedback timing sequence corresponding to the first HARQ process based on the first configuration set.

Or, in response to the first HARQ process corresponding to a non-enabled state, the terminal device does not acquire the HARQ feedback timing sequence corresponding to the first HARQ process.

The embodiments of the present disclosure provide a method for information processing, applied to the network device, including the following operations.

The network device sends a first configuration set to a terminal device. The first configuration set includes one or more configuration parameters corresponding to HARQ feedback timing information.

The network device sends first Downlink Control Information (DCI) to the terminal device. The first DCI is used to instruct the terminal device to transmit a first downlink physical channel through a first HARQ process.

Herein, when the first HARQ process corresponds to an enabled state, the first configuration set is used to enable the terminal device to acquire a HARQ feedback timing sequence corresponding to the first HARQ process based on the first configuration set. Or, when the first HARQ process corresponds to a non-enabled state, the first configuration set is used to enable the terminal device not to acquire the HARQ feedback timing sequence corresponding to the first HARQ process.

The embodiments of the present disclosure further provide a terminal device, including a first acquisition module, a receiving module, and a second acquisition module.

The first acquisition module is configured to acquire a first configuration set. The first configuration set includes one or more configuration parameters corresponding to HARQ feedback timing information.

The receiving module is configured to receive first Downlink Control Information (DCI). The first DCI is used to instruct the terminal device to transmit a first downlink physical channel through a first HARQ process.

The second acquisition module is configured to acquire a HARQ feedback timing sequence corresponding to the first HARQ process based on the first configuration set, in response to the first HARQ process corresponding to an enabled state.

The second acquisition module is configured not to acquire the HARQ feedback timing sequence corresponding to the first HARQ process, in response to the first HARQ process corresponding to a non-enabled state.

The embodiments of the present disclosure further provide a network device, including a first sending module, and a second sending module.

The first sending module is configured to send a first configuration set to a terminal device. The first configuration set includes one or more configuration parameters corresponding to HARQ feedback timing information.

The second sending module is configured to send first DCI to the terminal device. The first DCI is used to instruct the terminal device to transmit a first downlink physical channel through a first HARQ process.

Herein, when the first HARQ process corresponds to an enabled state, the first configuration set is used to enable the terminal device to acquire a HARQ feedback timing sequence corresponding to the first HARQ process based on the first configuration set. Or when the first HARQ process corresponds to a non-enabled state, the first configuration set is used to enable the terminal device not to acquire the HARQ feedback timing sequence corresponding to the first HARQ process.

The embodiments of the present disclosure further provide a terminal device, including a processor and a memory. The memory is configured to store a computer program, and the processor calls and runs the computer program stored in the memory to execute the method as described above.

The embodiments of the present disclosure further provide a network device, including a processor and a memory. The memory is configured to store a computer program, and the processor calls and runs the computer program stored in the memory to execute the method as described above.

The embodiments of the present disclosure also provide a chip, including a processor configured to call and run a computer program from a memory, so that a device provided with the chip executes the method as described above.

The embodiments of the present disclosure also provide a computer readable storage medium configured to store a computer program. Herein, the computer program enables a computer to execute the method as described above.

The embodiments of the present disclosure also provide a computer program product, including computer program instructions. Herein, the computer program instructions enable a computer to execute the method as described above.

The embodiments of the present disclosure also provide a computer program. The computer program enables a computer to execute the method as described above.

With the embodiments of the present disclosure, the terminal device may determine how to acquire the HARQ feedback timing sequence according to whether the HARQ process used to transmit the downlink physical channel corresponds to the non-enabled state or the enabled state. With some embodiments in the present disclosure, the DCI for scheduling downlink physical channel transmission may not include HARQ feedback timing indicator information, which can save signaling overhead.

BRIEF DESCRIPTION OF THE DRAWINGS

FIG. 3 is a flow block diagram of a method for information processing according to a terminal device side embodiment of the present disclosure.

FIG. 4 is a flow block diagram of a method for information processing according to a network device side embodiment of the present disclosure.

DETAILED DESCRIPTION

Figure 1A:
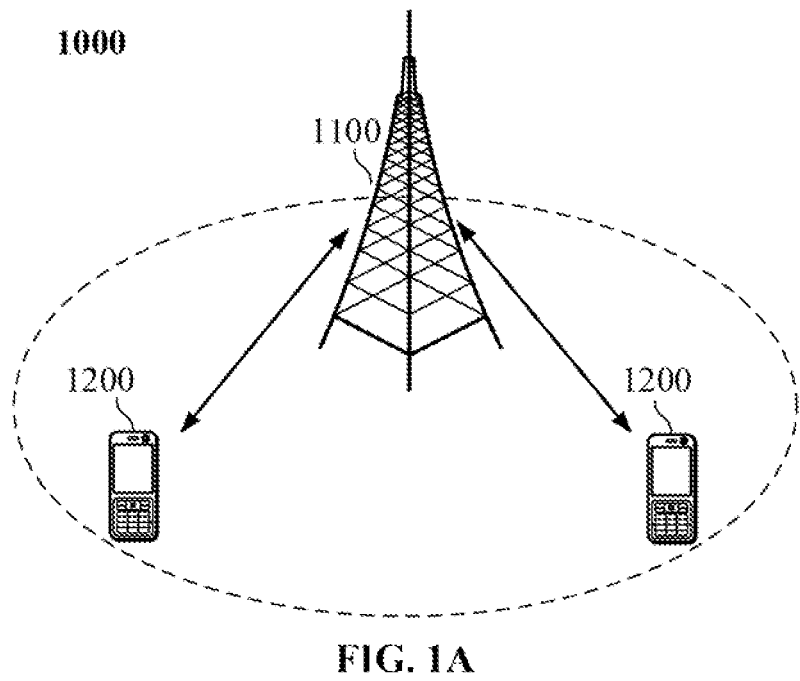
FIGS. 1A, 1B and 1C are schematic diagrams of a communication system architecture according to an embodiment of the present disclosure.

Technical solutions in the embodiments of the present disclosure will be described below in combination with the drawings in the embodiments of the present disclosure.

The technical solutions of the embodiments of the present disclosure may be applied to various communication systems, for example: a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolved system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation system, or another communication system.

Generally speaking, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC), Vehicle to Vehicle (V2V) communication, or Vehicle to everything (V2X) communication. The embodiments of the present disclosure may also be applied to these communication systems.

Optionally, a communication system in the embodiments of the present disclosure may be applied to a Carrier Aggregation (CA) scenario, or a Dual Connectivity (DC) scenario, or a Standalone (SA) network deployment scenario.

Each of the embodiments of the present disclosure is described in combination with a network device and a terminal device. The terminal device may also be referred to as User Equipment (UE), an access terminal, a user unit, a user ST, a mobile ST, a mobile radio ST, a remote ST, a remote terminal, a mobile device, a user terminal, a terminal, a wireless communication device, a user agent, a user device, etc.

The terminal device may be an ST in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, an onboard device, a wearable device, a terminal device in a next-generation communication system, for example, an NR network, a terminal device in a future evolved Public Land Mobile Network (PLMN), or the like.

In the embodiments of the present disclosure, the terminal device may be deployed on land, including indoor or outdoor, handheld, wearable or onboard, or may be deployed on the water surface (such as a ship), or may be deployed in the air (such as an airplane, a balloon or a satellite).

In the embodiments of the present disclosure, the terminal device may be a Mobile Phone, a Pad, a computer with a wireless transceiving function, a Virtual Reality (VR) terminal device, an Augmented Reality, AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example rather than restriction, in the embodiments of the present disclosure, the terminal device may also be a wearable device. The wearable device, also referred to as a wearable intelligent device, is a generic term of wearable devices obtained by performing intelligentization designing and development on daily wearing products, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

In the embodiments of the present disclosure, the network device may be a device configured to communicate with a mobile device. The network device may be an Access Point (AP) in the WLAN and a Base Transceiver Station (BTS) in the GSM or CDMA, or may be a NodeB (NB) in WCDMA, or may be an Evolutional Node B (eNB or eNodeB) in LTE, or a relay ST or AP, or an onboard device, a wearable device, a network device (a gNB) in the NR network, a network device in the future evolved PLMN, or the like.

As an example rather than restriction, in the embodiments of the present disclosure, the network device may have mobile characteristics. For example, the network device may be a mobile device. Optionally, the network device may be a satellite or a balloon ST. For example, a satellite may be a Low Earth Orbit (LEO) satellite, a Medium Earth Orbit (MEO) satellite, a Geosynchronous Earth Orbit (GEO) satellite, a High Elliptical Orbit (HEO) satellite, etc. Optionally, the network device may also be a base ST arranged in land, water or another place.

In the embodiments of the present disclosure, the network device may provide service for a cell, and the terminal device communicates with the network device through a transmission resource (for example, a frequency-domain resource or a spectrum resource) for the cell. The cell may be a cell corresponding to the network device (for example, a base ST). The cell may belong to a macro base ST or a base ST corresponding to a small cell. Here, the small cell may include: a metro cell, a micro cell, a pico cell, a femto cell and the like. These small cells have the characteristics of small coverage and low transmitted power and are suitable for providing high-rate data transmission service.

Exemplarily, FIG. 1A is an architecture diagram of another communication system according to an embodiment of the present disclosure. As shown in FIG. 1A, the communication system 1000 may include a network device 1100. The network device 1100 may be a device communicating with a terminal device 1200 (or referred to as a communication terminal, or a terminal). The network device 1100 may provide a communication coverage for a specific geographical region and communicate with the terminal device in the coverage.

FIG. 1A exemplarily illustrates a network device and two terminal devices. Optionally, the communication system 1000 may include multiple network devices and another number of terminal devices may be included in coverage of each network device, which is not limited in the embodiment of the present disclosure.

Figure 1B:
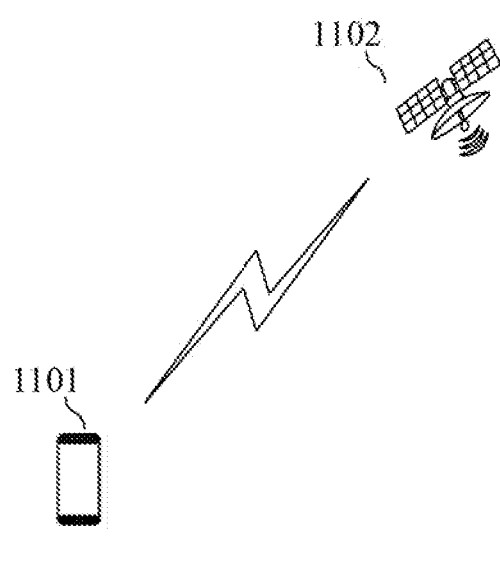

Exemplarily, FIG. 1B is an architecture diagram of another communication system according to an embodiment of the present disclosure. Referring to FIG. 1B, a terminal device 1101 and a satellite 1102 are included. Wireless communication may be performed between the terminal device 1101 and the satellite 1102. The network formed between the terminal device 1101 and the satellite 1102 may also be referred to as NTN. In the architecture of the communication system shown in FIG. 1B, the satellite 1102 may have the function of a base ST, and direct communication may be performed between the terminal device 1101 and the satellite 1102. Under the system architecture, the satellite 1102 may be referred to as a network device. Optionally, the communication system may include multiple network devices 1102 and another number of terminal devices may be included in coverage of each network device 1102, which is not limited in the embodiment of the present disclosure.

Figures 1C, 2:
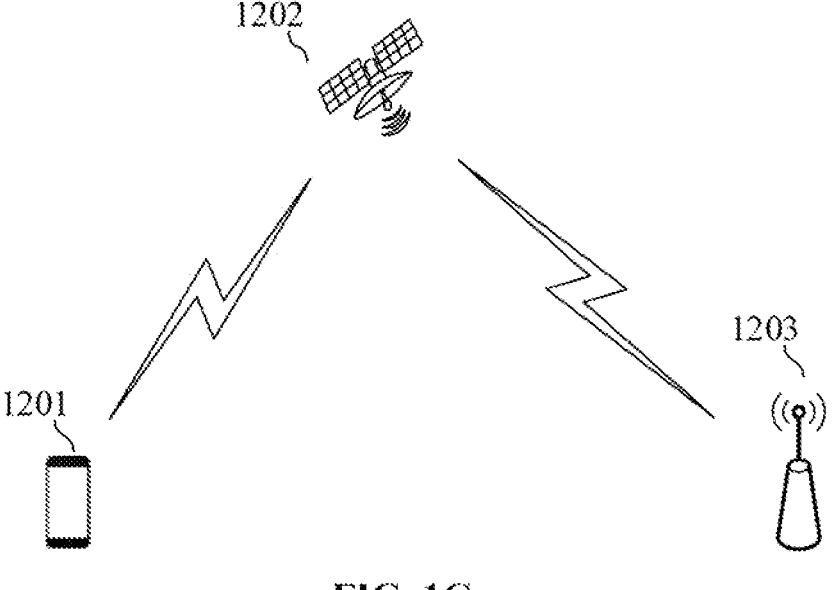
FIG. 2 is a schematic diagram of downlink transmission of a HARQ process with HARQ feedback disabled in downlink data transmission.

Exemplarily, FIG. 1 is an architecture diagram of another communication system according to an embodiment of the present disclosure. Referring to FIG. 1C, a terminal device 1201, a satellite 1202 and a base ST 1203 are included. Wireless communication may be performed between the terminal device 1201 and the satellite 1202, and the satellite 1202 may communicate with the base ST 1203. The network formed among the terminal device 1201, the satellite 1202 and the base ST 1203 may also be referred to as NTN. In the architecture of the communication system shown in FIG. 1C, the satellite 1102 may not have the function of the base ST, and the communication between the terminal device 1201 and the base ST 1203 requires the transit of the satellite 1202. Under the system architecture, the base ST 1203 may be referred to as a network device. Optionally, the communication system may include multiple network devices 1203 and another number of terminal devices may be included in coverage of each network device 1203, which is not limited in the embodiment of the present disclosure.

It is to be noted that FIGS. 1A-1C illustrate the system to which the present disclosure is applicable in the form of an example. Of course, the method shown in the embodiment of the present disclosure may also be applied to other systems, such as a 5G communication system and an LTE communication system, which is not specifically limited in the embodiment of the present disclosure.

Optionally, the wireless communication system shown in FIGS. 1A-1C may further include other network entities such as a Mobility Management Entity (MME), and an Access and Mobility Management Function (AMF), which is not limited in the embodiment of the present disclosure.

It is to be understood that terms "system" and "network" may usually be exchanged herein. The term "and/or" herein describes an association relationship of associated objects and represents, for example, that three relationships may exist. For example, A and/or B may represent the following three cases: Only A exists, both A and B exist, and only B exists. The character "/" herein generally indicates that the contextual objects are in an "or" relationship.

It is to be understood that the "indicator" mentioned in the embodiment of the present disclosure may be a direct indicator, or may be an indirect indicator, or may be an indicator indicating that there is an association relationship. For example, A indicates B, which may mean that A directly indicates B, for example, B being acquired through A, or may mean that A indirectly indicates B, for example, A indicating C, and B being acquired through C, or may mean that there is an association relationship between A and B.

In the description of the embodiment of the present disclosure, the term "correspondence" may mean that there is a direct correspondence or indirect correspondence between the two terms, or may mean that there is an association relationship between the two terms, or may mean a relationship of indicating and being indicated, or a relationship of configuring and being configured.

Optionally, the indicator information in the embodiment of the present disclosure includes at least one of physical layer signaling such as DCI, a Radio Resource Control (RRC) signaling or a Media Access Control Control Element (MAC CE).

Optionally, a high-level parameter or high-level signaling in the embodiment of the present disclosure includes at least one of an RRC signaling or an MAC CE.

In order to clearly explain the idea of the embodiment of the present disclosure, first, brief description is made to the related content of a HARQ mechanism in the communication system.

In a scenario in which the RTT is large, such as an NTN system, in order to improve the data transmission throughput between a gNB and a UE, the gNB may configure HARQ-ACK feedback to be disabled for a certain HARQ process of the UE. For the HARQ process configured with the HARQ-ACK feedback disabled, the gNB may reuse the HARQ process for data transmission without receiving HARQ-ACK information fed back by the UE. Therefore, the gNB may use the HARQ process with the HARQ-ACK feedback disabled to schedule multiple data packets for the UE, thus reducing the impact of RTT.

FIG. 2 schematically illustrates downlink transmission of a HARQ process 7 with HARQ feedback disabled in downlink data transmission. Herein, when the UE receives the scheduling of the HARQ process 7 by the gNB, and NDI information corresponding to the HARQ process 7 is reversed, it means that the HARQ process 7 is used to transmit a new data packet. For a Physical Downlink Shared Channel (PDSCH), such as PDSCH 0, transmitted in the HARQ process 7, the UE may not need to feed back a decoding result of PDSCH 0 to the gNB, or the UE may receive a new data packet scheduled by the gNB through the HARQ process 7 before feeding back the decoding result of PDSCH 0 to the gNB. For example, in the downlink data transmission of the NTN system, the gNB may indicate that HARQ feedback of a certain downlink HARQ process or some downlink HARQ processes is disabled for the UE. After introducing a disabled-state HARQ process, how the UE determines a feedback timing of the HARQ process needs further research, formulation and optimization.

Therefore, the embodiment of the present disclosure provides a method for information processing, applied to a terminal device, referring to FIG. 3, including at least part of the following content.

At S101, the terminal device acquires a first configuration set. The first configuration set includes one or more configuration parameters corresponding to HARQ feedback timing information.

At S102, the terminal device receives first DCI. The first DCI is used to instruct the terminal device to transmit a first downlink physical channel through a first HARQ process.

At S103, if the first HARQ process corresponds to an enabled state, the terminal device acquires a HARQ feedback timing corresponding to the first HARQ process based on the first configuration set.

Or, at S104, if the first HARQ process corresponds to a non-enabled state, the terminal device does not acquire the HARQ feedback timing corresponding to the first HARQ process.

According to the embodiment of the present disclosure, the first configuration set may be configured by a network device or may be preset. The first configuration set includes at least one configuration parameter. The configuration parameter corresponds to the HARQ feedback timing information, or the configuration parameter may be used to indicate the HARQ feedback timing information. Optionally, the first configuration set may be a HARQ feedback timing set configured by the network device. The terminal device receives the DCI, and the DCI is used to instruct the terminal device to transmit the downlink physical channel through a certain HARQ process (for example, the first HARQ process herein). Then, according to whether the first HARQ process corresponds to an enabled state or a non-enabled state, the terminal device may determine that the HARQ feedback timing corresponding to the first HARQ process may be acquired according to the first configuration set, or determine that there is no need to acquire the HARQ feedback timing corresponding to the first HARQ process.

Optionally, the first configuration set includes a HARQ feedback timing set. Optionally, the HARQ feedback timing set may be preset or configured by the network device. Optionally, the first configuration set is preset by the standard, or the first configuration set is configured by the first configuration information.

For example, for PDSCH scheduled by DCI format 1_0, the HARQ feedback timing set is preset. For PDSCH scheduled by DCI format 1_1 or DCI format 1_2, the HARQ feedback timing set may be configured by the network device. The preset HARQ feedback timing set includes a plurality of values, and the HARQ feedback timing set configured by the network device may include one or more values. Herein, one value in the HARQ feedback timing set may be considered as a configuration parameter, or one value in the HARQ feedback timing set may correspond to a piece of HARQ feedback timing information. The value in the HARQ feedback timing set may be represented by K1.

If the HARQ feedback timing set includes one value (or is configured with one value), the transmission timing sequence of the terminal device when feeding back HARQ-ACK is determined according to the configured value in the HARQ feedback timing set. If a plurality of values are included in the HARQ feedback timing set, the DCI format includes PDSCH-to-HARQ_feedback timing indicator information, or simply referred to as HARQ timing information. The HARQ feedback timing indicator information is used to dynamically indicate the time domain position of an HARQ feedback resource, such as a time slot of the HARQ feedback resource, from the HARQ feedback timing set.

As an example, the HARQ feedback timing set includes 8 values, and the HARQ feedback timing indicator information includes 3 bits. When the HARQ feedback timing indicator information is 000, it indicates a first K1 value in the HARQ feedback timing set. When the HARQ feedback timing indicator information is 001, it indicates a second K1 value in the HARQ feedback timing set, and so forth. The transmission timing sequence of the terminal device when feeding back HARQ-ACK is determined according to the K1 value in the HARQ feedback timing set indicated by the HARQ feedback timing indicator information in the DCI.

Optionally, the K1 value in the HARQ feedback timing set may include a valid value and/or an invalid value.

Optionally, the valid value may also be referred to as a valid K1 value or an available K1 value. The valid K1 value may mean that the K1 value corresponds to available HARQ feedback timing information, or the terminal device may determine a valid HARQ feedback timing sequence according to the K1 value. As an example, the valid K1 value is greater than or equal to 0.

Optionally, the invalid value may also be referred to as an invalid K1 value or an unavailable K1 value. The invalid K1 value may mean that the K1 value corresponds to unavailable HARQ feedback timing information, or the terminal device cannot determine a valid HARQ feedback timing sequence according to the K1 value. As an example, the invalid K1 value is −1.

Correspondingly, the present disclosure further provides a method for information processing, applied to a network device, referring to FIG. 4, including the following operations.

At S201, the network device sends a first configuration set to a terminal device. The first configuration set includes one or more configuration parameters corresponding to HARQ feedback timing information.

At S202, the network device sends first DCI to the terminal device. The first DCI is used to instruct the terminal device to transmit a first downlink physical channel through a first HARQ process.

Herein, when the first HARQ process corresponds to an enabled state, the first configuration set is used to enable the terminal device to acquire a HARQ feedback timing sequence corresponding to the first HARQ process based on the first configuration set. Or when the first HARQ process corresponds to a non-enabled state, the first configuration set is not used to enable the terminal device to acquire the HARQ feedback timing sequence corresponding to the first HARQ process.

With the embodiment of the present disclosure, the terminal device may determine how to acquire the HARQ feedback timing sequence according to whether the HARQ process used to transmit the downlink physical channel corresponds to the non-enabled state or the enabled state. With at least one embodiment in the present disclosure, the DCI for scheduling downlink physical channel transmission may not include HARQ feedback timing indicator information, which may save signaling overhead.

In the embodiment of the present disclosure, the state of the HARQ process may include an enabled state and a non-enabled state. Optionally, with the evolution of the standard, more states may be included, such as a semi-enabled state, and the present disclosure is not limited thereto.

Optionally, in the embodiment of the present disclosure, each HARQ process has a corresponding state. Herein, the state corresponding to the HARQ process may also be expressed as the state of the HARQ process, or expressed as that the HARQ process is configured as the enabled state or the non-enabled state.

From the perspective of HARQ-ACK feedback, the state of the HARQ process is the enabled state or the non-enabled state, which may also be expressed as that the HARQ feedback function state corresponding to the HARQ process may be the enabled state or the non-enabled. Or, the HARQ feedback function state corresponding to the HARQ process is configured as the enabled state or the non-enabled state.

In the embodiment of the present disclosure, the non-enabled state is also referred to as the disabled state.

Optionally, in some embodiments, the state of the HARQ process may be configured by high-level signaling, or may be dynamically indicated by dynamic signaling, such as the DCI, or may be implicitly determined. The configuration mode of the state of the HARQ process is not limited in the present disclosure.

It is to be understood that unless otherwise specified, the HARQ process (for example, the first HARQ process) in the embodiment refers to the downlink HARQ process.

Optionally, in some embodiments, the terminal device reports to the network device whether the terminal device supports the HARQ process disabling function.

Optionally, in some embodiments, the terminal device is configured to support HARQ process disabling by the network device through a high-level parameter.

Optionally, the first HARQ process corresponds to the non-enabled state, including at least one of the following situations.

After receiving the first downlink physical channel through the first HARQ process, the terminal device does not need to send HARQ-ACK information corresponding to the first downlink physical channel to the network device.

After sending the first downlink physical channel to the terminal device through the first HARQ process, the network device does not expect to receive the HARQ-ACK information corresponding to the first downlink physical channel sent by the terminal device.

After receiving the first downlink physical channel through the first HARQ process, the terminal device does not need to feed back the HARQ-ACK information corresponding to the first downlink physical channel according to the DCI scheduling the first downlink physical channel.

After sending the first downlink physical channel to the terminal device through the first HARQ process, the network device does not expect to receive the HARQ-ACK information corresponding to the first downlink physical channel according to the DCI scheduling the first downlink physical channel.

After receiving the first downlink physical channel through the first HARQ process, the terminal device needs to send the HARQ-ACK information corresponding to the first downlink physical channel to the network device.

After sending the first downlink physical channel to the terminal device through the first HARQ process, the network device expects to receive the HARQ-ACK information corresponding to the first downlink physical channel sent by the terminal device.

After receiving the first downlink physical channel through the first HARQ process, the terminal device may receive another downlink physical channel scheduled using the first HARQ process again before sending the HARQ-ACK information corresponding to the first downlink physical channel to the network device, or the terminal device is not restricted to receiving another downlink physical channel scheduled using the first HARQ process again merely after sending the HARQ-ACK information corresponding to the first downlink physical channel to the network device.

After scheduling the first downlink physical channel of the terminal device through the first HARQ process, the network device may schedule another downlink physical channel of the terminal device by reusing the first HARQ process before receiving the HARQ-ACK information corresponding to the first downlink physical channel sent by the terminal device, or there is no need to schedule another downlink physical channel of the terminal device by reusing the first HARQ process merely after receiving the HARQ-ACK information corresponding to the first downlink physical channel sent by the terminal device.

After receiving the first downlink physical channel through the first HARQ process, the terminal device may receive another downlink physical channel scheduled by the first HARQ process again within a first duration. Herein, the first duration is determined according to the length of the RTT, or the first duration is determined according to the position of an uplink feedback resource corresponding to the first downlink physical channel.

After scheduling the first downlink physical channel of the terminal device through the first HARQ process, the network device may schedule another downlink physical channel of the terminal device by reusing the first HARQ process within the first duration. Herein, the definition of the first duration may be referred to the above, which is not repeated in the present disclosure.

Optionally, the first HARQ process corresponds to the enabled state, including at least one of the following situations.

After receiving the first downlink physical channel through the first HARQ process, the terminal device needs to send the HARQ-ACK information corresponding to the first downlink physical channel to the network device.

After sending the first downlink physical channel to the terminal device through the first HARQ process, the network device expects to receive the HARQ-ACK information corresponding to the first downlink physical channel sent by the terminal device.

After receiving the first downlink physical channel through the first HARQ process, the terminal device needs to feed back the HARQ-ACK information corresponding to the first downlink physical channel according to the DCI scheduling the first downlink physical channel.

After sending the first downlink physical channel to the terminal device through the first HARQ process, the network device expects to receive the HARQ-ACK information corresponding to the first downlink physical channel according to the DCI scheduling the first downlink physical channel.

After receiving the first downlink physical channel through the first HARQ process, the terminal device does not expect to receive another downlink physical channel scheduled using the first HARQ process again before sending the HARQ-ACK information corresponding to the first downlink physical channel to the network device, or the terminal device needs to be restricted from receiving another downlink physical channel scheduled using the first HARQ process again before sending the HARQ-ACK information corresponding to the first downlink physical channel to the network device.

After scheduling the first downlink physical channel of the terminal device through the first HARQ process, the network device cannot schedule another downlink physical channel of the terminal device by reusing the first HARQ process before receiving the HARQ-ACK information corresponding to the first downlink physical channel sent by the terminal device. Alternatively, or only after receiving the HARQ-ACK information corresponding to the first downlink physical channel sent by the terminal device, the network device can schedule another downlink physical channel of the terminal device by reusing the first HARQ process.

After receiving the first downlink physical channel through the first HARQ process, the terminal device cannot receive another downlink physical channel scheduled by the first HARQ process again within a first duration. Herein, the definition of the first duration may be referred to the above, which is not repeated in the present disclosure.

After scheduling the first downlink physical channel of the terminal device through the first HARQ process, the network device cannot schedule another downlink physical channel of the terminal device by reusing the first HARQ process within the first duration. Herein, the definition of the first duration may be referred to the above, which is not repeated in the present disclosure.

Optionally, the first downlink physical channel includes at least one as follows:

first PDSCH scheduled by the first DCI;

first Semi-Persistent Scheduling (SPS) SPS PDSCH activated by the first DCI, the first DCI being the DCI for configuration and activation of SPS PDSCH, and the first DCI being used to schedule transmission of the first SPS PDSCH;

PDCCH for downlink DL SPS PDSCH release;

PDCCH for an indicator of a dormancy or non-dormancy behavior for SCells); and

SPS PDSCH without physical downlink control channel PDCCH scheduling in the first SPS PDSCH configuration activated by the first DCI.

Of course, the first downlink physical channel may also be another downlink physical channel transmitted by the network device through the HARQ process, which is not limited in the present disclosure.

In the embodiment of the present disclosure, optionally, the terminal device determines whether the first HARQ process corresponds to the enabled state or the non-enabled state according to first indicator information. The first indicator information includes at least one of RRC signaling, MAC CE or DCI. For example, the network device may configure the first HARQ process to correspond to the enabled state or the disabled state through RRC signaling. After determining whether the first HARQ process corresponds to the enabled state or the non-enabled state, the terminal device may further adopt various processing modes to determine whether to acquire or not acquire the HARQ feedback timing corresponding to the first HARQ process.

Detailed description is made below to the various processing modes.

Case 1: The First Configuration Set Includes a Configuration Parameter, and the First DCI Does Not Include HARQ Feedback Timing Indicator Information.

In the embodiment of the present disclosure, optionally, the first configuration set includes a configuration parameter. The configuration parameter is a first configuration parameter, and the first configuration parameter corresponds to a piece of available HARQ feedback timing information. The first DCI does not include the HARQ feedback timing indicator information.

The operation that, if the first HARQ process corresponds to an enabled state, the terminal device acquires a HARQ feedback timing corresponding to the first HARQ process based on the first configuration set in S103 includes that: if the terminal device determines that the first HARQ process corresponds to the enabled state, the terminal device determines the HARQ feedback timing corresponding to the first HARQ process according to the first configuration parameter.

The operation that, if the first HARQ process corresponds to a non-enabled state, the terminal device does not acquire the HARQ feedback timing corresponding to the first HARQ process in S104 includes that: if the terminal device determines that the first HARQ process corresponds to the non-enabled state, the terminal device does not acquire the HARQ feedback timing corresponding to the first HARQ process.

As an example, the UE is configured with a valid K1 value by the gNB through first configuration information such as dl-DataToUL-ACK or dl-DataToUL-ACKForDCIFormat1_2. Or, the first configuration set of the UE configured by the first configuration information includes a configuration parameter, and the configuration parameter indicates a piece of available HARQ feedback timing information.

The UE receives the first downlink physical channel transmitted through the first HARQ process scheduled by the first DCI. Herein, the first HARQ process corresponds to a first HARQ process number, and the first HARQ process number is preset. Or the first HARQ process number is indicated by HARQ process number indicator information in the first DCI.

If the UE determines that the first HARQ process corresponds to the enabled state according to the first HARQ process number, the UE determines the HARQ feedback timing of the first HARQ process through the valid K1 value.

Or, if the UE determines that the first HARQ process corresponds to the non-enabled state according to the first HARQ process number, the UE determines that the HARQ feedback timing of the first HARQ process scheduled using the first DCI is an invalid value. Or, the UE does not determine the HARQ feedback timing when the first HARQ process is scheduled using the first DCI. Or, the UE determines that the HARQ-ACK information corresponding to the first downlink physical channel is not fed back. Or, the UE determines the HARQ feedback timing corresponding to the first HARQ process according to the scheduling of a later HARQ process corresponding to the enabled state.

Case 2: The First Configuration Set Includes Two Configuration Parameters, and the First DCI Does Not Include the HARQ Feedback Timing Indicator Information.

In the embodiment of the present disclosure, optionally, the first configuration set includes two configuration parameters, and the two configuration parameters include a second configuration parameter and a third configuration parameter. The second configuration parameter corresponds to a piece of available HARQ feedback timing information (or the second configuration parameter is a valid value). The third configuration parameter corresponds to a piece of unavailable HARQ feedback timing information (or the third configuration parameter is an invalid value). The first DCI does not include the HARQ feedback timing indicator information.

The operation that, if the first HARQ process corresponds to an enabled state, the terminal device acquires a HARQ feedback timing corresponding to the first HARQ process based on the first configuration set in S103 includes that: if the terminal device determines that the first HARQ process corresponds to the enabled state, the terminal device determines the HARQ feedback timing corresponding to the first HARQ process according to the second configuration parameter.

The operation that, if the first HARQ process corresponds to a non-enabled state, the terminal device does not acquire the HARQ feedback timing corresponding to the first HARQ process in S104 includes that: if the terminal device determines that the first HARQ process corresponds to the non-enabled state, the terminal device does not acquire the HARQ feedback timing corresponding to the first HARQ process, or the terminal device determines that the HARQ feedback timing corresponding to the first HARQ process corresponds to the third configuration parameter.

As an example, the UE is configured with a valid K1 value and an invalid K1 value by the gNB through the first configuration information such as dl-DataToUL-ACK or dl-DataToUL-ACKForDCIFormat1_2. Or, the first configuration set of the UE configured by the first configuration information includes two configuration parameters. The second configuration parameter in the two configuration parameters indicates a piece of available HARQ feedback timing information, and the third configuration parameter in the two configuration parameters indicates a piece of unavailable HARQ feedback timing information.

The UE receives the first downlink physical channel transmitted through the first HARQ process scheduled by the first DCI. Herein, the first HARQ process corresponds to a first HARQ process number, and the first HARQ process number is preset. Or the first HARQ process number is indicated by HARQ process number indicator information in the first DCI.

If the UE determines that the first HARQ process corresponds to the enabled state according to the first HARQ process number, the UE determines the HARQ feedback timing of the first HARQ process through the valid K1 value.

Or, if the UE determines that the first HARQ process corresponds to the non-enabled state according to the first HARQ process number, the UE determines that the HARQ feedback timing when the first HARQ process is scheduled using the first DCI corresponds to the invalid K1 value. Or, the UE does not determine the HARQ feedback timing when the first HARQ process is scheduled using the first DCI. Or, the UE determines not to feedback the HARQ-ACK information corresponding to the first downlink physical channel. Or, the UE determines the HARQ feedback timing corresponding to the first HARQ process according to the scheduling of an immediately next HARQ process corresponding to the enabled state.

As another embodiment of case 2, optionally, the first configuration set includes two configuration parameters. The two configuration parameters include a second configuration parameter and a third configuration parameter. The second configuration parameter corresponds to the HARQ feedback timing information in the enabled state, and the third configuration parameter corresponds to the HARQ feedback timing information in the non-enabled state. The first DCI does not include the HARQ feedback timing indicator information.

The operation that, if the first HARQ process corresponds to an enabled state, the terminal device acquires a HARQ feedback timing corresponding to the first HARQ process based on the first configuration set in S103 includes that: if the terminal device determines that the first HARQ process corresponds to the enabled state, the terminal device determines the HARQ feedback timing corresponding to the first HARQ process according to the second configuration parameter.

The above operation S104 may be replaced by an operation that if the first HARQ process corresponds to the non-enabled state, or if the terminal device determines that the first HARQ process corresponds to the non-enabled state, the terminal device determines the HARQ feedback timing corresponding to the first HARQ process according to the third configuration parameter.

The above operation S202 may be replaced by an operation that the network device sends First DCI to the terminal device. The first DCI is used to instruct the terminal device to transmit a first downlink physical channel through a first HARQ process.

Herein, when the first HARQ process corresponds to the enabled state, the first configuration set is used to enable the terminal device to acquire the HARQ feedback timing corresponding to the first HARQ process based on the second configuration parameter in the first configuration set. Or, when the first HARQ process corresponds to the non-enabled state, the first configuration set is used to enable the terminal device to acquire the HARQ feedback timing corresponding to the first HARQ process based on the third configuration parameter in the first configuration set.

Optionally, the second configuration parameter corresponds to a piece of available HARQ feedback timing information, and the third configuration parameter corresponds to a piece of available HARQ feedback timing information.

As an example, the UE is configured with a first valid K1 value and a second valid K1 value by the gNB through the first configuration information such as dl-DataToUL-ACK or dl-DataToUL-ACKForDCIFormat1_2. Or, the first configuration set of the UE configured by the first configuration information includes two configuration parameters. The second configuration parameter in the two configuration parameters indicates a piece of available HARQ feedback timing information, and the third configuration parameter in the two configuration parameters indicates a piece of available HARQ feedback timing information.

The UE receives the first downlink physical channel transmitted through the first HARQ process scheduled by the first DCI. Herein, the first HARQ process corresponds to a first HARQ process number, and the first HARQ process number is preset. Or, the first HARQ process number is indicated by the HARQ process number indicator information in the first DCI.

If the UE determines that the first HARQ process corresponds to the enabled state according to the first HARQ process number, the UE determines the HARQ feedback timing of the first HARQ process through the first valid K1 value.

If the UE determines that the first HARQ process corresponds to the non-enabled state according to the first HARQ process number, the UE determines the HARQ feedback timing of the first HARQ process through the second valid K1 value.

Case 3: The First DCI Includes HARQ Feedback Timing Indicator Information, and the First Configuration Set Includes at Least One First-Type Configuration Parameter (Valid Value) and at Least One Second-Type Configuration Parameter (Invalid Value).

In the embodiment of the present disclosure, optionally, the first DCI includes HARQ feedback timing indicator information. The first configuration set includes at least one first-type configuration parameter and at least one second-type configuration parameter. The first-type configuration parameter includes a valid K1 value which corresponds to the HARQ feedback timing information in the enabled state, and the second-type configuration parameter includes an invalid K1 value which corresponds to the HARQ feedback timing information in the non-enabled state.

Optionally, if the HARQ feedback timing indicator information indicates a fourth configuration parameter in the first-type configuration parameter, the terminal device determines that the first HARQ process corresponds to the enabled state, and determines the HARQ feedback timing corresponding to the first HARQ process according to the fourth configuration parameter. Or, if the HARQ feedback timing indicator information indicates the fourth configuration parameter, and the fourth configuration parameter belongs to the first-type configuration parameter (or the fourth configuration parameter is a valid K1 value), the terminal device determines that the first HARQ process corresponds to the enabled state, and determines the HARQ feedback timing corresponding to the first HARQ process according to the fourth configuration parameter.

Optionally, if the HARQ feedback timing indicator information indicates a fifth configuration parameter in the second-type configuration parameter, the terminal device determines that the first HARQ process corresponds to the non-enabled state, and the terminal device does not acquire the HARQ feedback timing corresponding to the first HARQ process, or the terminal device determines that the HARQ feedback timing corresponding to the first HARQ process corresponds to the fifth configuration parameter. Or, if the HARQ feedback timing indicator information indicates the fifth configuration parameter, and the fifth configuration parameter belongs to the second-type configuration parameter (or the fifth configuration parameter is an invalid K1 value), the terminal device determines that the first HARQ process corresponds to the non-enabled state, and the terminal device does not acquire the HARQ feedback timing corresponding to the first HARQ process, or the terminal device determines that the HARQ feedback timing corresponding to the first HARQ process corresponds to the fifth configuration parameter.

Optionally, the HARQ feedback timing set includes at least one invalid K1 value and at least one valid K1 value.

When the HARQ feedback timing indicator information in the first DCI indicates the invalid K1 value in the HARQ feedback timing set, the UE determines that the first HARQ process corresponds to the non-enabled state according to the first DCI. Or, when a HARQ feedback timing indicator information field in the first DCI indicates the valid K1 value in the HARQ feedback timing set, the UE determines that the first HARQ process corresponds to the enabled state according to the first DCI.

As an example, assuming that the HARQ feedback timing set includes one invalid K1 value (for example, $K1=-1$) and N valid K1 values, and N is greater than or equal to 1. The number of bits in the HARQ feedback timing indicator information field included in the DCI format corresponding to the first DCI is determined according to ceil (log2 (N+1)). Herein, ceil ( ) represents a ceiling operation. For example, when N=2, the number of bits in the HARQ feedback timing indicator information field included in the first DCI is 2 bits.

As another example, assuming that the HARQ feedback timing set includes one invalid K1 value (for example, $K1=-1$) and N valid K1 values, and N is greater than or equal to 1. The number of bits in the HARQ feedback timing indicator information field included in the DCI format corresponding to the first DCI is determined according to ceil (log2 (N)). Herein, ceil ( ) represents a ceiling operation. For example, when N=2, the number of bits in the HARQ feedback timing indicator information field included in the first DCI is 1 bit. Optionally, in this case, if the UE determines that the first HARQ process corresponds to the non-enabled state, the UE does not determine the corresponding HARQ feedback timing according to the HARQ feedback timing indicator information in the first DCI.

Case 4: The First DCI Corresponds to the First DCI Format or the Second DCI Format.

In the embodiment of the present disclosure, optionally, if the first DCI corresponds to the first DCI format, and the first DCI format does not include the HARQ feedback timing indicator information, the terminal device determines that the first HARQ process corresponds to the non-enabled state, and the terminal device does not acquire the HARQ feedback timing corresponding to the first HARQ process.

In the embodiment of the present disclosure, optionally, if the first DCI corresponds to the second DCI format, and the second DCI format includes the HARQ feedback timing indicator information, the terminal device determines that the first HARQ process corresponds to the enabled state, and acquires the HARQ feedback timing corresponding to the first HARQ process based on the configuration parameter in the first configuration set indicated by the HARQ feedback timing indicator information in the second DCI format.

Optionally, the UE may determine whether the first HARQ process corresponds to the non-enabled state or the enabled state according to the first DCI. For example, the first DCI format corresponds to the scheduling of the HARQ process in the non-enabled state, and the second DCI format corresponds to the scheduling of the HARQ process in the enabled state. If the first DCI received by the UE corresponds to the first DCI format, the UE determines that the first HARQ process corresponds to the non-enabled state, or if the first DCI received by the UE corresponds to the second DCI format, the UE determines that the first HARQ process corresponds to the enabled state.

Optionally, the first DCI format includes DCI format 1_1 or DCI format 1_2 or a DCI format other than DCI format 1_0.

Optionally, the second DCI format includes DCI format 1_0.

Optionally, the second DCI format includes a HARQ feedback timing indicator information field. As mentioned above, the HARQ feedback timing indicator information field is used to dynamically indicate the time domain position of a HARQ feedback resource, such as a time slot of the HARQ feedback resource, represented by K1.

As an example, the HARQ feedback timing set includes, for example, 3 bits. When the HARQ feedback timing indicator information is 000, it indicates a first value in the HARQ feedback timing set. When the HARQ feedback timing indicator information is 001, it indicates a second value in the HARQ feedback timing set, and so forth.

Optionally, the HARQ feedback timing set includes at least two valid K1 values. As an example, the HARQ feedback timing set may be configured by the first configuration information such as dl-DataToUL-ACK or dl-Data-ToUL-ACKForDCIFormat1_2.

As an example, assuming that the HARQ feedback timing set includes N K1 values, and N is greater than or equal to 2, the number of bits in the HARQ feedback timing indicator information field included in the second DCI format is determined according to ceil (log2 (N)). For example, when N=3, the number of bits in the HARQ feedback timing indicator information field included in the second DCI format is 2 bits.

With any of the above embodiments or the combination of multiple embodiments, optionally, the UE also considers an offset value Koffset when determining the HARQ feedback timing corresponding to the first HARQ process. Optionally, the value of Koffset is determined according to the RTT or a timing advance (TA). Optionally, the value of Koffset is indicated by the gNB, or the Koffset value is determined by the UE itself, or the Koffset value is preset.

In the embodiment of the present disclosure, optionally, the first indicator information is further used to indicate the number of HARQ processes in a first HARQ process set and/or a second HARQ process set. The first HARQ process set includes a HARQ process(es) corresponding to the enabled state, and the second HARQ process set includes a HARQ process(es) corresponding to the non-enabled state. Then, the terminal device may determine whether the first HARQ process corresponds to the enabled state or the non-enabled state according to the HARQ process set to which the first HARQ process belongs.

Through any one or combination of the above multiple embodiments, the terminal device of the embodiment of the present disclosure can determine how to acquire the HARQ feedback timing sequence. Description is made to the specific implementation process of the embodiment of the present disclosure by the following specific example.

In the embodiment of the present disclosure, optionally, the UE receives RRC configuration information sent by the gNB, and the RRC configuration information is used to configure a downlink HARQ process with uplink HARQ-ACK feedback disabled. Herein, the number of HARQ processes configured by the UE is 16, and the RRC configuration information is used to configure the number of HARQ processes in the second HARQ process set to be 1. Then, the UE may determine that the second HARQ process set includes HARQ process 0, and the first HARQ process set includes HARQ processes 1 to 15. The RRC configuration information is also used to configure the second HARQ process set as the HARQ process set with uplink HARQ-ACK feedback disabled. That is, HARQ process 0 corresponds to the non-enabled state, and HARQ processes 1 to 15 correspond to the enabled state.

The DCI format for scheduling PDSCH configured for the UE does not include the HARQ feedback timing indicator information field, and the UE is configured with a valid K1 value (that is, the first configuration parameter) by the gNB through a high-level parameter (that is, first configuration information), for example, dl-DataToUL-ACK or dl-Data-ToUL-ACKForDCI Format1_2.

①When the UE receives the first PDSCH scheduled by the gNB through the first DCI and transmitted using the first HARQ process, if the first HARQ process corresponds to the enabled state, the UE determines the HARQ feedback timing corresponding to a decoding result of the first PDSCH according to the valid K1 value configured by the high-level parameter.

② When the UE receives the first PDSCH scheduled by the gNB through the first DCI and transmitted using the first HARQ process, if the first HARQ process corresponds to the non-enabled state, the UE does not determine the HARQ feedback timing corresponding to the decoding result of the first PDSCH, or the UE determines not to feed back the decoding result of the first PDSCH.

Figure 5:
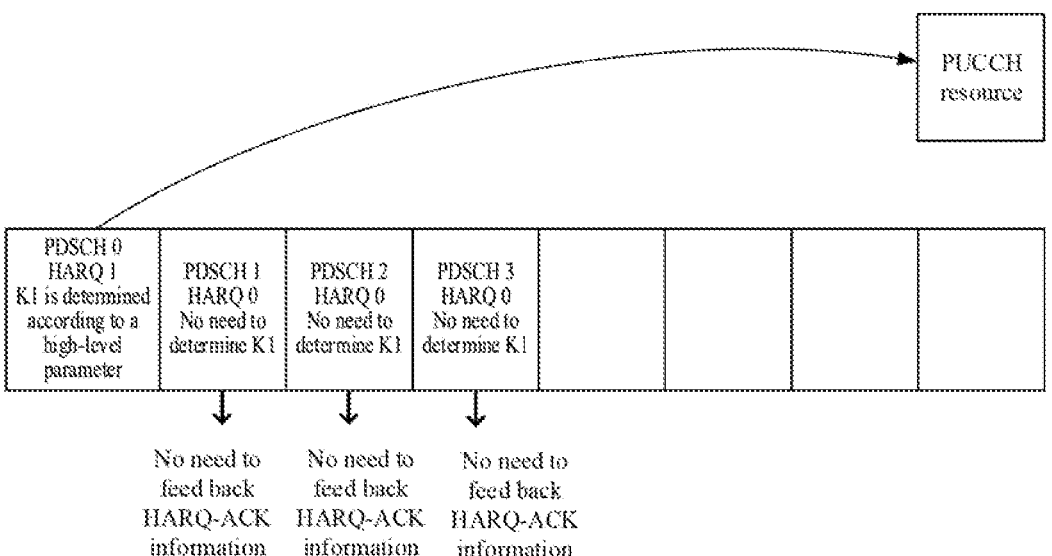
FIG. 5 is a schematic diagram of a plurality of downlink physical channels and corresponding HARQ processes according to an embodiment of the present disclosure.

As shown in FIG. 5, if the UE receives PDSCH 0 scheduled by the DCI, and the HARQ process corresponding to the PDSCH 0 belongs to the second HARQ process set, for example, HARQ process 1, the UE determines the HARQ feedback timing corresponding to PDSCH 0 according to the valid K1 value configured according to the high-level parameter (first configuration information), and then determines the time domain position of the PUCCH resource corresponding to the decoding result of PDSCH 0.

If the UE receives PDSCH 1, PDSCH 2 or PDSCH 3 scheduled by the DCI, and the HARQ process(es) corresponding to the PDSCH 1, PDSCH 2 or PDSCH 3 belong to the first HARQ process set, for example, all being HARQ process 0, the UE does not determine the HARQ feedback timing corresponding to PDSCH 1, PDSCH 2 or PDSCH 3, or the UE determines not to feed back the decoding result of PDSCH 1, PDSCH 2 or PDSCH 3.

According to at least one of the above embodiments of the present disclosure, when the UE is configured with one or some HARQ processes corresponding to the non-enabled state, the DCI format for scheduling PDSCH transmission may not include HARQ feedback timing indicator information, and the UE determines whether to determine the HARQ feedback timing according to the high-level configuration parameter according to the non-enabled state or enabled state corresponding to the HARQ process used to transmit PDSCH, which can reduce the signaling overhead in the DCI.

The specific setting and implementation mode of the embodiments of the present disclosure are described from different angles through the above multiple embodiments. Corresponding to the processing method of the above at least one embodiment, the embodiment of the present disclosure also provides a terminal device 100, referring to FIG. 6, including a first acquisition module 110, a receiving module 120 and a second acquisition module 130.

The first acquisition module 110 is configured to acquire a first configuration set. The first configuration set includes one or more configuration parameters corresponding to HARQ feedback timing information.

The receiving module 120 is configured to receive first DCI. The first DCI is used to instruct the terminal device to transmit a first downlink physical channel through a first HARQ process.

The second acquisition module 130 is configured to acquire, when the first HARQ process corresponds to an enabling state, a HARQ feedback timing corresponding to the first HARQ process based on the first configuration set.

The second acquisition module 130 is configured not to acquire, when the first HARQ process corresponds to a non-enabled state, the HARQ feedback timing corresponding to the first HARQ process.

Figure 7:
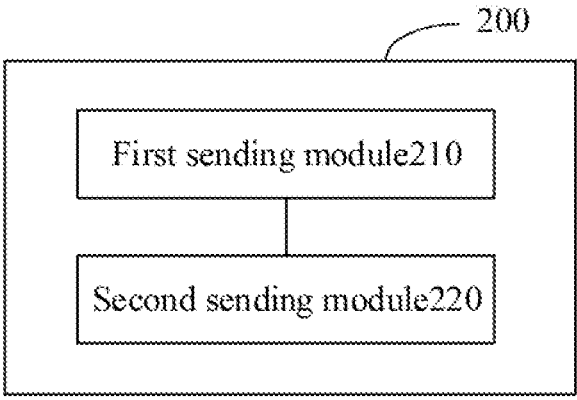
FIG. 7 is a structural schematic block diagram of a network device according to an embodiment of the present disclosure.

Corresponding to the processing method of the above at least one embodiment, the embodiment of the present disclosure also provides a network device 200, referring to FIG. 7, including a first sending module 210 and a second sending module 220.

The first sending module 210 is configured to send a first configuration set to a terminal device. The first configuration set includes one or more configuration parameters corresponding to HARQ feedback timing information.

The second sending module 220 is configured to send first DCI to the terminal device. The first DCI is used to instruct the terminal device to transmit a first downlink physical channel through a first HARQ process.

Herein, when the first HARQ process corresponds to the enabled state, the first configuration set is used to enable the terminal device to acquire a HARQ feedback timing corresponding to the first HARQ process based on the first configuration set. Or, when the first HARQ process corresponds to the non-enabled state, the first configuration set is used to enable the terminal device not to acquire the HARQ feedback timing corresponding to the first HARQ process.

With the embodiment of the present disclosure, the terminal device can determine how to acquire the HARQ feedback timing sequence according to whether the HARQ process used to transmit the downlink physical channel corresponds to the non-enabled state or the enabled state. With some embodiments in the present disclosure, the DCI for scheduling downlink physical channel transmission may not include HARQ feedback timing indicator information, which can save signaling overhead.

The terminal device 400 and the network device 200 in the embodiment of the present disclosure can realize the corresponding functions of the terminal device in the method embodiment. The process, function, implementation mode, and beneficial effect corresponding to each module (submodule, unit, component, or the like) in the terminal device 400 and the network device 200 may refer to the corresponding descriptions in the method embodiment, and will not be elaborated herein.

It is to be noted that the function described with respect to each module (submodule, unit, component, or the like) in the terminal device 400 and network device 200 of the embodiment of the present disclosure may be realized by different modules (submodules, units, components, or the like), or by the same module (submodule, unit, component or the like). For example, the first sending module and the second sending module may be different modules or may be the same module, both of which can realize the corresponding function of the terminal device in the embodiment of the present disclosure.

Figure 8:
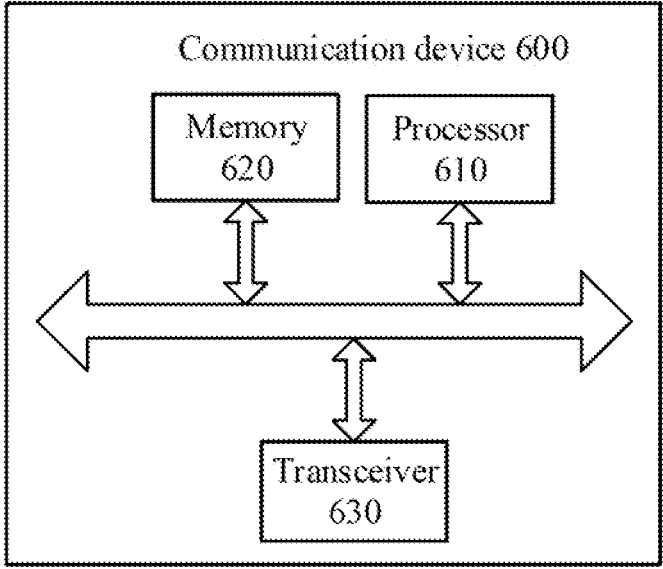
FIG. 8 is a schematic block diagram of a communication device according to an embodiment of the present disclosure.

FIG. 8 is a structural schematic diagram of a communication device 600 according to an embodiment of the present disclosure. Herein, the communication device 600 includes a processor 610, and the processor 610 may call and run a computer program from a memory to implement the method in the embodiment of the present disclosure.

Optionally, the communication device 600 may further include a memory 620. The processor 610 may call and run the computer program from the memory 620 to implement the method in the embodiment of the present application.

The memory 620 may be a separate device independent of the processor 610 or integrated in the processor 610.

Optionally, the communication device 600 may also include a transceiver 630, and the processor 610 may control the transceiver 630 to communicate with other devices. Specifically, same may send information or data to or receive information or data sent by other devices.

The transceiver 630 may include a transmitter and a receiver. The transceiver 630 may further include an antenna, and the number of antennas may be one or more.

Optionally, the communication device 600 may be the network device of the embodiments of the present disclosure. The communication device 600 may implement corresponding flows implemented by the network device in each method of the embodiments of the present disclosure. For brevity, elaborations are omitted herein.

Optionally, the communication device 600 may be the terminal device of the embodiments of the present disclosure. The communication device 600 may implement corresponding flows implemented by the terminal device in each method of the embodiments of the present disclosure. For brevity, elaborations are omitted herein.

Figure 9:
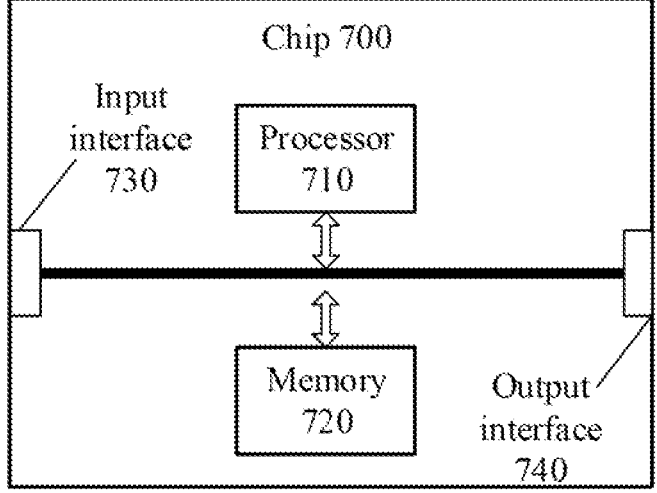
FIG. 9 is a schematic block diagram of a chip according to an embodiment of the present disclosure.

FIG. 9 is a structural schematic diagram of a chip 700 according to an embodiment of the present disclosure. Herein, the chip 700 includes a processor 710, and the processor 710 may call and run a computer program from a memory to implement the method in the embodiment of the present disclosure.

Optionally, the chip 700 may further include a memory 720. The processor 710 may call and run the computer program from the memory 720 to implement the method in the embodiment of the present application.

The memory 720 may be a separate device independent of the processor 710 or integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device of the embodiments of the present disclosure. The chip may implement corresponding flows implemented by the network device in each method of the embodiments of the present disclosure. For brevity, elaborations are omitted herein.

Figure 6:
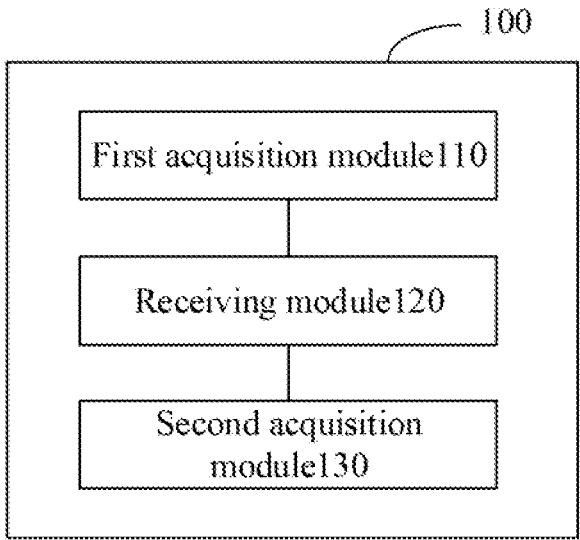
FIG. 6 is a structural schematic block diagram of a network device according to an embodiment of the present disclosure.

Optionally, the chip may be applied to the terminal device of the embodiment in FIG. 6 of the present disclosure. The chip may implement corresponding flows implemented by the terminal device in each method of the embodiments of the present disclosure. For brevity, elaborations are omitted herein.

It is to be understood that the chip mentioned in the embodiment of the disclosure may also be called a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

Figure 10:
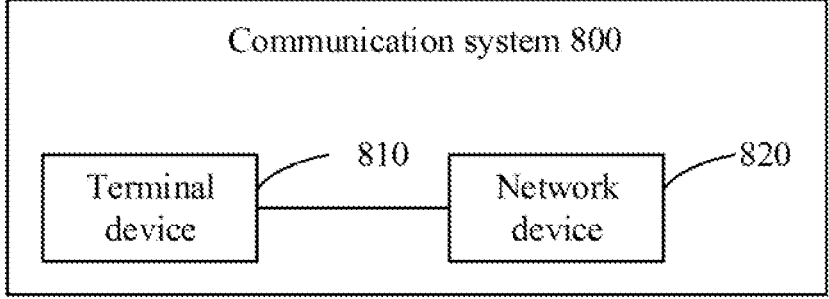
FIG. 10 is a schematic block diagram of a communication system according to an embodiment of the present disclosure.

FIG. 10 is a schematic block diagram of a communication system 800 according to an embodiment of the present disclosure. The communication system 800 includes a terminal device 810 and a network device 820.

The terminal device 810 may be configured to realize the corresponding functions realized by the terminal device in the method of various embodiments of the present disclosure, and the network device 820 may be configured to realize the corresponding functions realized by the network device in the method of various embodiments of the present disclosure. For brevity, elaborations are omitted herein.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the present disclosure are completely or partially generated. The computer may be a universal computer, a dedicated computer, a computer network, or another programmable device. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (such as coaxial cable, optical fiber, and Digital Subscriber Line (DSL)) or wireless (such as infrared, radio, and microwave) manner. The computer-readable storage medium may be any available medium accessible for the computer or a data storage device integrated with one or more available media, such as a server and a data center. The available medium may be a magnetic medium (for example, a floppy disk, a hard disk and a magnetic tape), an optical medium (for example, a Digital Video Disk (DVD)), a semiconductor medium (for example, a Solid State Disk (SSD)), or the like.

It is further to be understood that the sequence numbers of the foregoing processes do not mean execution sequences in various embodiments of the present application. The execution sequences of the processes should be determined according to functions and internal logics of the processes, and should not be construed as any limitation to the implementation processes of the embodiments of the present application.

Those skilled in the art may clearly learn about that specific working processes of the system, device, and unit described above may refer to the corresponding processes in the method embodiment and will not be elaborated herein for ease and briefness of description.

The above is only the specific implementation mode of the present application and not intended to limit the scope of protection of the present application. Any variations or replacements apparent to those skilled in the art within the technical scope disclosed by the present application shall fall within the scope of protection of the present application. Therefore, the scope of protection of the present application shall be subjected to the scope of protection of the claims.

The invention claimed is:

1. A method for information processing, applied to a terminal device, the method comprising:
    acquiring, by the terminal device, a first configuration set, wherein the first configuration set comprises one or more configuration parameters corresponding to Hybrid Automatic Repeat Request (HARQ) feedback timing information, the one or more configuration parameters of the first configuration set comprise a third configuration parameter, and the third configuration parameter corresponds to unavailable HARQ feedback timing information;
    receiving, by the terminal device, first Downlink Control Information (DCI), wherein the first DCI is configured to instruct the terminal device to transmit a first downlink physical channel through a first HARQ process, and the first DCI does not comprise HARQ feedback timing indicator information; and
    in response to the first HARQ process being configured with HARQ-ACK feedback enabled, acquiring, by the terminal device, a HARQ feedback timing corresponding to the first HARQ process based on the first configuration set; or
    in response to the first HARQ process being configured with HARQ-ACK feedback disabled, not acquiring, by the terminal device, the HARQ feedback timing corresponding to the first HARQ process; wherein
    in response to the first HARQ process being configured with the HARQ-ACK feedback disabled, not acquiring, by the terminal device, the HARQ feedback timing corresponding to the first HARQ process specifically comprises: in response to the terminal device determining that the first HARQ process is configured with the HARQ-ACK feedback disabled, determining, by the terminal device, that the HARQ feedback timing corresponding to the first HARQ process corresponds to the third configuration parameter.

2. The method of claim 1, further comprising:
    determining, by the terminal device, whether the first HARQ process is configured with the HARQ-ACK feedback enabled or disabled according to first indicator information, wherein the first indicator information comprises at least one of Radio Resource Control (RRC) signaling, Media Access Control Control Element (MAC CE), or DCI.

3. The method of claim 1, wherein the one or more configuration parameters of the first configuration set further comprise a second configuration parameter, and the second configuration parameter corresponds to available HARQ feedback timing information, wherein in response to the first HARQ process being configured with the HARQ-ACK feedback enabled, acquiring, by the terminal device, a HARQ feedback timing corresponding to the first HARQ process based on the first configuration set comprises: in response to the terminal device determining that the first HARQ process is configured with the HARQ-ACK feedback enabled, determining, by the terminal device, the HARQ feedback timing corresponding to the first HARQ process according to the second configuration parameter.

4. The method of claim 1, wherein the first DCI corresponds to a first DCI format, and the terminal device determines that the first HARQ process is configured with the HARQ-ACK feedback disabled, and the terminal device does not acquire the HARQ feedback timing corresponding to the first HARQ process.

5. The method of claim 2, wherein the first indicator information is further configured to indicate a number of HARQ processes in a first HARQ process set and/or a second HARQ process set, the first HARQ process set comprises a HARQ process configured with the HARQ-ACK feedback enabled, and the second HARQ process set comprises a HARQ process configured with the HARQ-ACK feedback disabled, wherein the method further comprises:

determining, by the terminal device, whether the first HARQ process is configured with the HARQ-ACK feedback enabled or disabled according to the HARQ process set to which the first HARQ process belongs.

6. The method of claim 1, wherein the first configuration set is preset or configured by the network device.

7. The method of claim 1, wherein the first DCI is configured to instruct the terminal device to transmit the first downlink physical channel through the first HARQ process, comprises:

the first DCI being configured to schedule or activate transmission of the first downlink physical channel, wherein the first downlink physical channel corresponds to the first HARQ process, and the first HARQ process corresponds to a first HARQ process number.

8. The method of claim 1, wherein the first downlink physical channel comprises at least one of the following:

a first Physical Downlink Shared Channel (PDSCH) scheduled by the first DCI;

a first Semi-Persistent Scheduling (SPS) SPS PDSCH activated by the first DCI, wherein the first DCI is DCI for configuration and activation of SPS PDSCHs, and the first DCI is configured to schedule transmission of the first SPS PDSCH;

a PDCCH for downlink DL SPS PDSCH release;

a PDCCH for indicating a dormancy or non-dormancy behavior for SCells; or an SPS PDSCH without PDCCH scheduling in the first SPS PDSCH configuration activated by the first DCI.

9. A method for information processing, applied to a network device, comprising:

sending, by the network device, a first configuration set to a terminal device, the first configuration set comprising one or more configuration parameters corresponding to Hybrid Automatic Repeat Request (HARQ) feedback timing information, the one or more configuration parameters of the first configuration set comprise a third configuration parameter, and the third configuration parameter corresponds to unavailable HARQ feedback timing information; and sending, by the network device, first Downlink Control Information (DCI) to the terminal device, the first DCI being configured to instruct the terminal device to transmit a first downlink physical channel through a first HARQ process, and the first DCI does not comprise HARQ feedback timing indicator information; and wherein, when the first HARQ process is configured with HARQ-ACK feedback enabled, the first configuration set is configured to enable the terminal device to acquire a HARQ feedback timing corresponding to the first HARQ process based on the first configuration set; or when the first HARQ process is configured with HARQ-ACK feedback disabled, the first configuration set is not configured to enable the terminal device to acquire the HARQ feedback timing corresponding to the first HARQ process; wherein when the terminal device determines that the first HARQ process is configured with the HARQ-ACK feedback disabled, the third configuration parameter is configured to enable the terminal device to determine the HARQ feedback timing corresponding to the first HARQ process.

10. The method of claim 9, further comprising:

sending, by the network device, first indicator information to the terminal device, wherein the first indicator information is configured to enable the terminal device to determine whether the first HARQ process is configured with the HARQ-ACK feedback enabled or disabled, and the first indicator information comprises at least one of Radio Resource Control (RRC) signaling, Media Access Control Control Element (MAC CE), or DCI.

11. The method of claim 9, wherein the one or more configuration parameters of the first configuration set further comprise a second configuration parameter, and the second configuration parameter corresponds to available HARQ feedback timing information, and wherein when the terminal device determines that the first HARQ process is configured with the HARQ-ACK feedback enabled, the second configuration parameter is configured to enable the terminal device to determine the HARQ feedback timing corresponding to the first HARQ process.

12. The method of claim 9, further comprising:

the first DCI corresponding to a first DCI format, and the first DCI format is configured to enable the terminal device to determine that the first HARQ process is configured with the HARQ-ACK feedback disabled, and not to acquire the HARQ feedback timing corresponding to the first HARQ process.

13. The method of claim 10, wherein the first indicator information is further configured to indicate a number of HARQ processes in a first HARQ process set and/or a second HARQ process set, the first HARQ process set comprises a HARQ process configured with the HARQ-ACK feedback enabled, the second HARQ process set comprises a HARQ process configured with the HARQ-ACK feedback disabled, and the HARQ process set to which the first HARQ process belongs is configured to enable the terminal device to determine whether the first HARQ process is configured with the HARQ-ACK feedback enabled or disabled.

14. The method of claim 9, wherein the first configuration set is preset or configured by the network device.

15. The method of claim 9, wherein the first DCI is configured to schedule or activate transmission of the first downlink physical channel, the first downlink physical channel corresponds to the first HARQ process, and the first HARQ process corresponds to a first HARQ process number.

16. The method of claim 9, wherein the first downlink physical channel comprises at least one of the following:

a first Physical Downlink Shared Channel (PDSCH) scheduled by the first DCI;

a first Semi-Persistent Scheduling (SPS) SPS PDSCH activated by the first DCI, wherein the first DCI is DCI for configuration and activation of SPS PDSCHs, and the first DCI is configured to schedule transmission of the first SPS PDSCH;

a PDCCH for downlink DL SPS PDSCH release;

a PDCCH for indicating a dormancy or non-dormancy behavior for SCells; or an SPS PDSCH without PDCCH scheduling in the first SPS PDSCH configuration activated by the first DCI.

17. A terminal device, comprising:

a transceiver, configured to:

acquire a first configuration set, wherein the first configuration set comprises one or more configuration parameters corresponding to Hybrid Automatic Repeat Request (HARQ) feedback timing information, the one or more configuration parameters of the first configuration set comprise a third configuration parameter, and the third configuration parameter corresponds to unavailable HARQ feedback timing information;

receive first Downlink Control Information (DCI), wherein the first DCI is configured to instruct the terminal device to transmit a first downlink physical channel through a first HARQ process, and the first DCI does not comprise HARQ feedback timing indicator information; and acquire a HARQ feedback timing corresponding to the first HARQ process based on the first configuration set, in response to the first HARQ process being configured with HARQ-ACK feedback enabled, or not to acquire the HARQ feedback timing corresponding to the first HARQ process, in response to the first HARQ process being configured with HARQ-ACK feedback disabled;

wherein the terminal device further comprises a processor, configured to:

in response to determining that the first HARQ process is configured with the HARQ-ACK feedback disabled, determine that the HARQ feedback timing corresponding to the first HARQ process corresponds to the third configuration parameter.

* * * * *